United States Patent Office 3,523,148
Patented Aug. 4, 1970

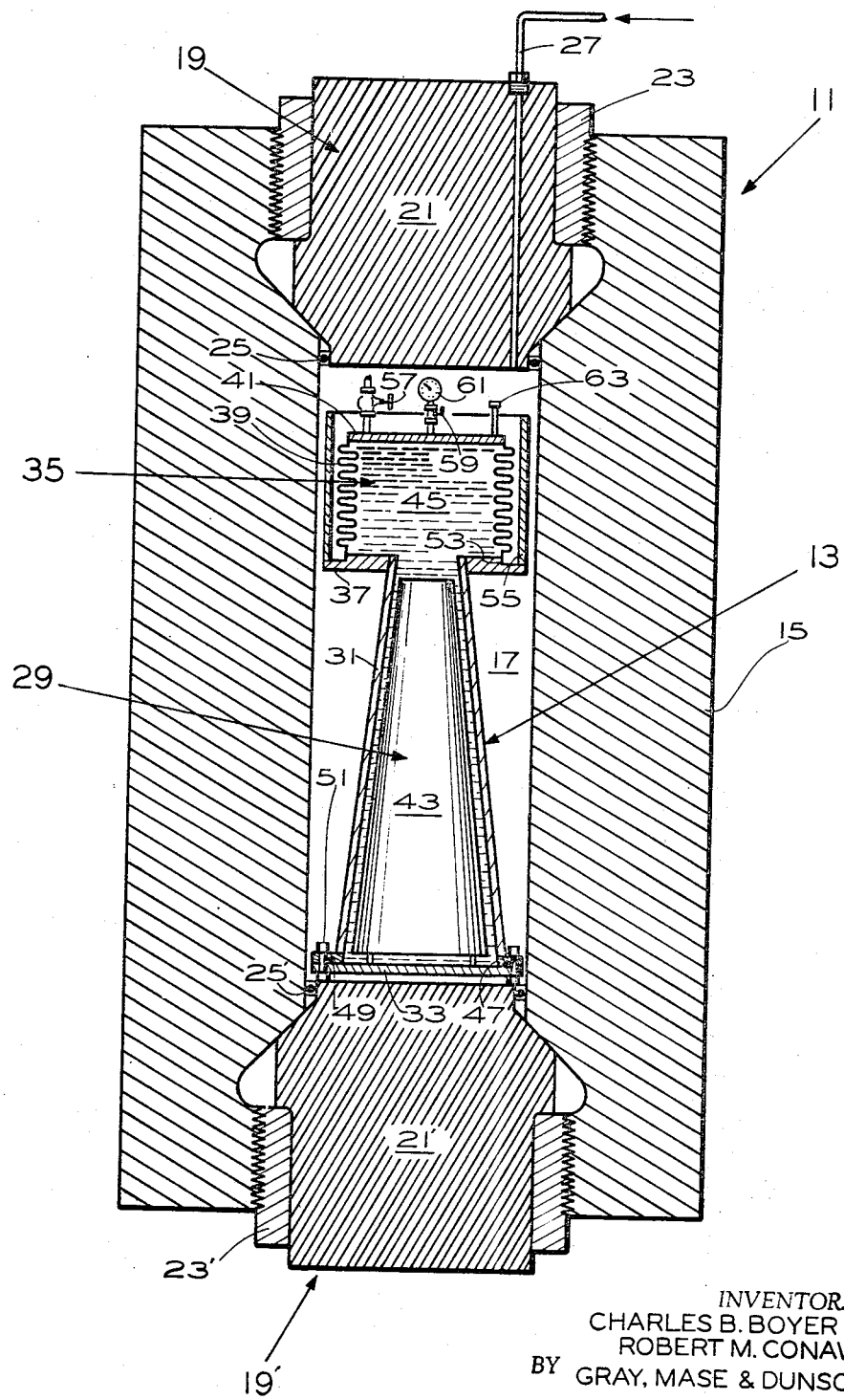

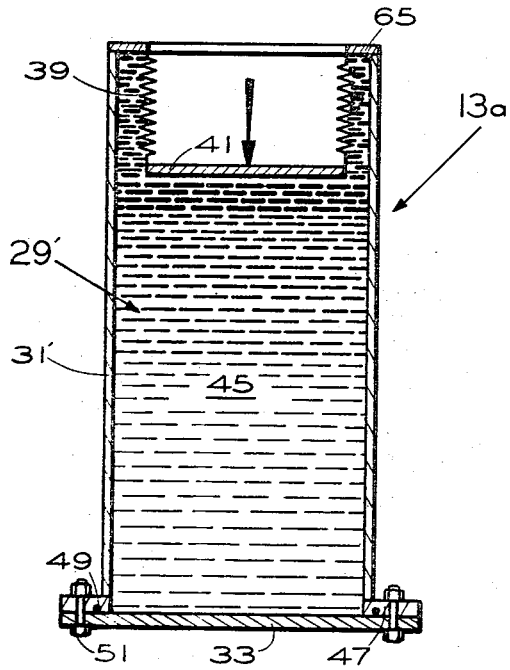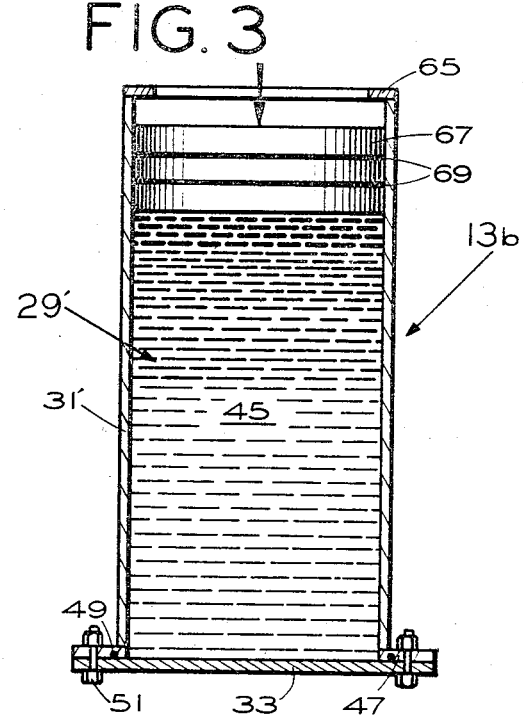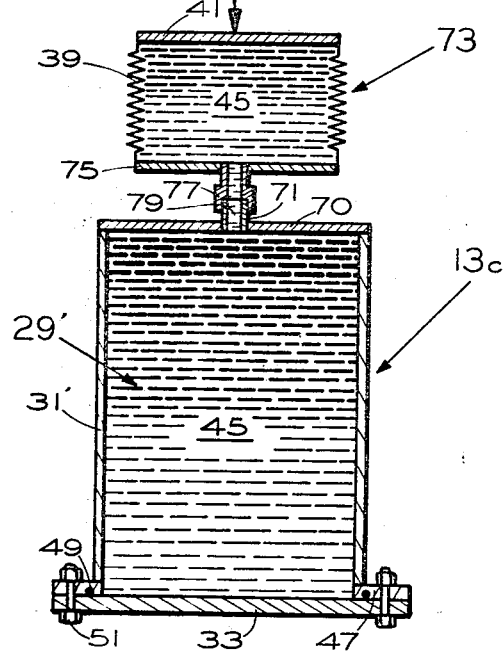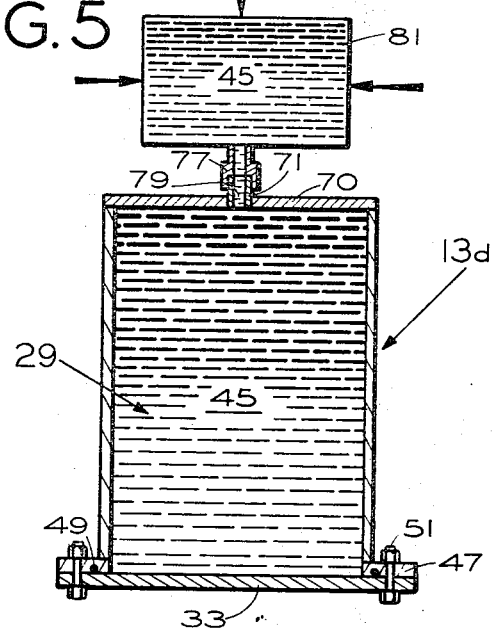

3,523,148
ISOSTATIC PRESSURE TRANSMITTING
APPARATUS AND METHOD
Charles B. Boyer and Robert M. Conaway, Columbus,
Ohio, assignors to The Battelle Development Corporation, Columbus, Ohio, a corporation of Delaware
Filed Jan. 4, 1968, Ser. No. 695,781
Int. Cl. B30b 13/00
U.S. Cl. 264—88     26 Claims

ABSTRACT OF THE DISCLOSURE

Isostatic pressure transmitting apparatus which comprises a fluid-tight pressure vessel, means for pressurizing the vessel, a fluid-tight enclosure within the vessel having a moveable member comprising a portion of its outer surface whereby the volume of the enclosure may be varied in response to externally applied pressure, and a fluid substantially filling the enclosure. The method of isostatically compacting materials comprising confining the material in a flexible envelope, evacuating and sealing the envelope, placing the envelope in a fluid-tight enclosure having a moveable member comprising a portion of its outer surface, filling the enclosure with a fluid and sealing it, and applying fluid pressure to the enclosure to cause the moveable member to move inwardly to compress the fluid in the enclosure and deform the envelope inwardly so as to compact the materials.

BACKGROUND OF THE INVENTION

This invention relates generally to transmitting isostatic pressure and more particularly to apparatus and methods for transmitting isostatic pressure to an object through mediums which may have differing compressibilities.

The current interest in gas-pressure bonding and compaction and in hydrostatic bonding and compaction has created a need for better and more simplified apparatus and techniques for use with these processes. At the present time gas pressure compaction of a powdered metal shape requires two separate steps involving two large and expensive pieces of equipment. The powdered metal is first compacted into a preform using a hydrostatic pressure vessel. The preform is then transferred to an isostatic gas pressure furnace, or autoclave as they are commonly termed, for final compaction. The hydrostatic pressure vessel and the autoclave both require high strength pressure vessels and complex sealing heads. Separate pumping systems and instrumentation are required for each vessel. The high initial expenditure involved in such installations has been a significant deterrent to commercial acceptance of the gas pressure and hydrostatic compaction and bonding processes.

In the past gas pressure autoclaves have been used as hydrostatic vessels by removing the heater unit, disconnecting and removing all electrical and thermocouple leads, and then pumping a liquid through the pressurizing system. However, this method requires extensive clean-up of the vessel and pumping system and re-installation of the electrical and thermocouple leads before the vessel can be used again as a gas pressure autoclave. Also, if salt water or other corrosive liquids are used as the pressurizing medium, the vessel and pumping system may be damaged.

The present invention makes it possible to use gas pressure autoclaves as hydrostatic vessels and thus eliminates or substantially reduces the number of separate hydrostatic vessels required. A typical gas pressure autoclave that may be converted according to this invention is disclosed in copending application Ser. No. 681,857, "High Pressure Furnace," filed Nov. 9, 1967, now U.S. Pat. 3,427,011, in the names of Charles B. Boyer and Franklin D. Orcutt. The autoclave described in that application may be converted to a hydrostatic vessel simply by removing the concentric shell heater unit and inserting the fluid-tight pressure transmitting enclosure according to this invention. By using gas pressure autoclaves for this dual purpose, idle down time of the gas pressure vessel may be decreased appreciably.

Where high pressure is applied to liquids, significant changes in volume result. If a closed container filler with a specimen and pressure transmitting liquid were placed in a typical high pressure vessel and subjected to a high external pressure, for example 15,000 to 30,000 p.s.i., the container will collapse. To eliminate this problem the present invention incorporates a pressure transmitting and volume compensating moveable member into the closed container to compensate for the changes in volume.

The most significant feature of this invention is that pressure may be applied to a part with one fluid (e.g., salt water) while pumping a more convenient fluid (e.g., an inert gas or a low viscosity motor oil). Fluids having significantly differing compressibilities may be used without danger of the specimen container collapsing. Another advantage is that hazardous material such as powdered beryllium may be isolated to prevent accidental dispersal of it throughout the entire system. The invention will also allow different liquid media to be utilized within a hydrostatic vessel without concern for the vessel or pumping system.

The present invention may also be used to convert isostatic or hydrostatic vessels for use in environmental testing such as simulation of ocean depths. Instruments or apparatus designed for deep submergence may be tested using conventional gas pressure vessels. The apparatus is simply placed in a fluid-tight enclosure according to this invention and the enclosure is filled with salt water of the appropriate concentration. The enclosure is then sealed and placed in a gas pressure or hydrostatic vessel where it is subjected to high external pressure. Pressures equal to those present thousands of feet below the ocean's surface may be simulated for extended periods of time using presently available equipment. The use of the separate fluid-tight enclosure eliminates the need for pumping corrosive salt water into the pressure vessel and thus prolongs vessel and pumping system life. Various electrical leads and connections for actuating and monitoring devices may be easily installed in the enclosure to facilitate testing.

SUMMARY OF THE INVENTION

A typical isostatic pressure transmitting apparatus according to this invention comprises a fluid-tight pressure vessel, means for maintaining superatmospheric pressures within the pressure vessel, a fluid-tight enclosure positioned within the pressure vessel and having a work-receiving area and at least one pressure transmitting area, the pressure transmitting area having at least one moveable member comprising an outer wall thereof whereby the volume of the fluid-tight enclosure may be varied in response to externally applied pressure, and a pressure transmitting medium substantially filling the fluid-tight enclosure.

The moveable member of the pressure transmitting area may extend into the work-receiving area or it may project outwardly therefrom. The moveable member may be a pleated expansible bellows, a piston, a diaphragm, a collapsible envelope or any other suitable means. Means may also be provided for maintaining elevated temperatures within the pressure vessel. Typically the pressure transmitting medium is a liquid such as water, salt water, or oil.

The method of isostatically compacting materials according to this invention comprises confining powdered materials in a flexible envelope, evacuating and sealing the envelope, placing the envelope in a fluid-tight enclosure having a least one moveable member comprising a portion of its outer surface, filling the enclosure with a pressure transmitting medium and sealing the enclosure, and applying fluid pressure externally to the enclosure to cause the moveable member to move inwardly to compress the pressure transmitting medium and deform the envelope inwardly. The external fluid pressure is typically maintained for a period of time sufficient to compact the powdered materials into a body of particular shape and density. The enclosure may be prepressurized to position the moveable member. The pressure transmitting medium is typically a liquid such as water or oil and the external fluid pressure is typically applied by an inert gas such as helium or argon. Bonding of powdered materials or structures may be achieved by heating the materials in the enclosure to a temperature not greater than their bonding temperature.

BRIEF DESCRIPTION OF THE DRAWINGS

FIG. 1 is a sectional view taken vertically through the center of one embodiment of the pressure transmitting apparatus according to this invention.

FIGS. 2, 3, 4, and 5 are vertical section views of alternate embodiments of the fluid-tight enclosure used in the apparatus of this invention.

DESCRIPTION OF THE PREFERRED EMBODIMENT

FIG. 1 illustrates a typical isostatic pressure transmitting apparatus according to this invention. The apparatus consists generally of a pressure vessel assembly 11 having a fluid-tight enclosure 13 positioned coaxially therein. The pressure vessel assembly 11 includes an elongated hollow cylindrical body member 15 open at both ends and defining a cylindrical chamber 17. Two pressure-tight sealing heads 19 and 19' seal the upper and lower ends respectively of the body member 15. The heads 19 and 19' consist of closure plugs 21 and 21' which are secured to the body member 15 by annular nuts 23 and 23'. O-ring seals 25 and 25' form a fluid-tight seal between the body member 15 and the closure plugs 21 and 21'. The sealing heads 19 and 19' and the body member 15 are typically constructed of high strength steels or steel alloys such as A.I.S.I. Type 410 Stainless Steel or S.A.E. Type 4340 Modified Steel, the selection of material depending primarily on the desired pressure capabilities of the apparatus. Other forms of sealing heads may be used to seal the ends of body member 15 without departing from the scope of the invention. Typical closure heads which may be employed include full Bridgeman closures, modified Bridgeman closures, and metal-to-metal with an O-ring type closure. These and other available closures are described in E. W. Comings, "High-Pressure Technology," McGraw-Hill, New York, N.Y. (1956).

High-pressure line 27 extends through pressure-tight fittings in the upper closure plug 21 and is connected with an external compressor (not shown). The pressurizing medium which is preferably an inert gas such as helium or argon gas enters the vessel assembly 11 through the high-pressure line 27. Other gases or even liquids may be used as a pressurizing medium where desired. Typically multistage compressors are used to pressurize the gas and various filters (not shown) remove moisture and impurities from the gas before it enters the vessel assembly. Due to the cost of helium and argon gas and to the convenience of operation, these gases are recycled in storage tanks after use.

Still referring to FIG. 1, the fluid-tight enclosure 13 is positioned coaxially in the cylindrical chamber 17 of the vessel assembly 11. The enclosure 13 consists of a work-receiving area 29 defined generally by a hollow frusto-conical shell 31, a closure plate 33, and a pressure transmitting area 35 defined generally by a flat annular ring 37, a pleated expansible bellows 39, and a pressure plate 41. A frusto-conical specimen 43 is shown positioned in the work-receiving area 29 of the enclosure 13 prior to operation of the apparatus. A pressure transmitting medium 45, preferably a fluid, surrounds the specimen 43 in the fluid-tight enclosure.

In practice the shell 31 may be of any convenient shape. The configuration shown in FIG. 1 is suited for holding the frusto-conical type part with a minimum of free volume. While such a configuration is advantageous, it is not necessary to limit the free volume except in high performance situations. The free volume can also be reduced by using filler block of some suitable material (high bulk modulus). The specimen 43 may protrude into the bellows 39 provided it does not interfere with the motion of the bellows.

The frusto-conical shell 31 is generally a rigid, pressure-resistant shell of a high-strength material such as A.I.S.I. Type 410 Stainless Steel. Fluid-tight closure of the base of the frusto-conical shell 31 is accomplished using an annular flange 47, the disc-shaped closure plate 33 and an O-ring 49. Bolts 51 are spaced at close intervals about the circumference of the flange 47 and secure the plate 33 to the flange. The closure plate 33 is removed for loading and unloading the specimen 43 from the work-receiving area 29. There may also be a drain plug (not shown) located near the bottom of the shell 31 for removing the pressurizing after operation.

Still referring to FIG. 1, the annular ring 37 is secured as by welding to the upper end of the shell 31 such that the ring 37 extends radially outward from the upper end of the shell. The ring 37 is formed with an annular step 53 in its upper surface at a distance from its center which corresponds to the radius of the lower end of the bellows 39. The lower end of the generally cylindrical bellows 39 is secured to the annular step 53 in a fluid-tight relationship by appropriate means such as welding when metallic bellows are employed or clamps when leather or rubber bellows are used. The pressure plate 41 is secured also by welding or clamps to the upper end of the bellows 39. A hollow cylindrical guard member 55 is secured to the outer edge of the annular ring 37 and extends upwardly to laterally surround the bellows 39 at a short distance from it. The guard member 55 protects against damage to the bellows during loading and unloading of the enclosure from the vessel assembly.

For high-pressure applications the bellows 39 is preferably constructed of a metal such as A.I.S.I. Type 304 Stainless Steel. Suitable bellows are commercially available from Tube Turns, Inc., and are commonly used for thermal expansion compensation in piping. Although most bellows are not designed or guaranteed for use in devices such as the present invention, experience has shown them to be adequate.

Selection of the proper bellows is made on a basis of volumetric change of the bellows for maximum allowable change of length. All materials change in volume when pressure is applied to them. This is obviously true in the case of gases. The same phenomenon is noted in liquids and to a lesser extent in solids. Knowing the pressure required for a particular application and the bulk modulus and amount of all the materials within the enclosure 13 including the pressure transmitting medium 45, the change in volume of the materials within the enclosure at the required pressure can be calculated. This change can amount to from 5 to 15 percent or more of the internal volume when pressures in excess of 5,000 p.s.i. are required. Thus, from manufacturers' data a bellows can be selected having sufficient length to compensate for this volume change. In high performance situations (pressures in excess of 20,000 p.s.i.), it is often necessary to prepressurize the enclosure to stretch the bellows so as to prevent the bellows from exceeding design limitations during pressurization. This prepressurization will be described more fully later.

Filler valve 57, gauge valve 59 with a removable pressure gauge 61, and bleed tube 63 are mounted with fluid-tight fittings in the pressure plate 41. The filler valve 57 is used in filling the enclosure 13 with the pressure transmitting medium 45 when the medium 45 is a liquid or a gas. The pressure gauge 61 is removably connected to the gauge valve 59 and is used when prepressurization of the enclosure 13 is required. The bleed tube 63 is used to remove air from the enclosure 13 while the enclosure is being filled with the pressure transmitting medium.

Electrical leads and connections may be installed in both the pressure vessel assembly 11 and the fluid-tight enclosure 13 to provide for utilization of various actuation and monitoring devices in the apparatus.

The apparatus of this invention may be used for cold isostatic pressing or compacting of powder preforms. The method of isostatic compacting according to this invention allows powder preforms to be produced in the same high pressure furnaces or autoclaves as are used in the final gas pressure bonding or compacting processes. This method of compacting typically involves first packing the powdered materials into a thin flexible envelope or container and evacuating and fluid-type sealing the envelope. The use of such flexible envelopes is well known in the gas pressure bonding art and does not require further description. For purposes of discussion, the specimen 43 in FIG. 1 will be considered to be a filled and sealed envelope.

Using FIG. 1, the specimen 43 is loaded into the enclosure 13 after removing the closure plate 33. The plate 33 is then replaced and secured by the bolts 51. Pressure transmitting fluid 45 is then pumped into the fluid-tight enclosure 13 through the filler valve 57. The enclosure is usually agitated during filling to remove entrapped air which is bled off through the bleed tube 63. If no prepressurization is required, the filling is continued until the fluid 45 spills out through the tube 63. The tube 63 is then sealed and the filler valve 57 is closed.

Whether prepressurization is required is determined by calculating from the Bulk Modulus of all materials within the enclosure (powdered materials, envelope, and pressurizing fluid) what the change in internal volume of the enclosure will be under maximum required pressurization. From this the maximum travel of the bellows during the application of external pressure can be determined. If the maximum travel of the bellows is greater than that allowable according to the manufacturers' specifications for permissible displacement, then prepressurization of the enclosure is necessary. To prepressurize, the bleed tube 63 is sealed when the pressurizing fluid begins to spill out and pumping of the fluid into the enclosure is continued until the bellows has expanded a predetermined amount to compensate for the difference in maximum bellows travel over allowable bellows travel. Since the amount of bellows travel depends on the internal pressure, the required internal pressure can be determined in advance and prepressurization can then be discontinued when the predetermined internal pressure is achieved as indicated by the pressure gauge 61. The filler valve 57 is then closed and excess fluid bled off through the bleed tube 63. The gauge valve 59 is then closed and the pressure gauge 61 is removed from the apparatus to avoid damage during external pressurization. It should be noted that prepressurization also should not extend the bellows beyond allowable limits. If calculations indicate that the bellows will be extended close to or beyond its allowable limits under prepressurization, alternate bellows having greater strength or capacity should be employed.

After filling, the enclosure 13 is placed within the pressure vessel assembly 11 and the sealing heads 19 and 19′ are secured in position. The enclosure 13 is then subjected to a high external gas or liquid pressure for a predetermined period of time whereby the pressure plate 41 and the bellows 39 are moved inwardly to compress the pressure transmitting fluid 45 and apply pressure to the specimen 43. Where the specimen 43 is a powdered material encased in an envelope, the compressed fluid 45 will deform the envelope inwardly to compact the powdered material. During compaction, the pressure within the enclosure 13 is equalized with the external pressure in the vessel assembly 11 and is isostatic.

After compaction the pressure vessel assembly 11 is depressurized and the enclosure 13 is removed. The fluid 45 is then drained from the enclosure and the specimen removed.

The foregoing method may also be used for bonding of materials or structures. These applications generally involve heating the enclosure and materials to the bonding temperature of the materials. The heating may be accomplished by placing the enclosure 13 within a furnace unit such as those typically used in high pressure autoclaves and inserting the entire assembly in the vessel assembly 11 with appropriate electrical connections installed. A high-pressure furnace suitable for this application is disclosed in U.S. Pat. 3,427,011 previously mentioned.

When bonding structures according to this invention, the individual parts are first assembled in the desired configuration and the assembly is encased in a flexible envelope. The envelope is then evacuated to bring the mating surfaces of the structure into intimate contact. The envelope assembly is then positioned in a fluid-tight enclosure as provided by this invention and the enclosure is filled with a pressure transmitting fluid as previously described. The enclosure is then subjected to external fluid pressure as in the compacting operation and simultaneously subjected to heat not greater than the bonding temperature of the materials. The fluid pressure deforms the envelope inwardly to press the mating surfaces of the structure together and bonding occurs. It should be noted that when bonding dissimilar metals according to this process, the bonding temperature of the lowest melting point material is controlling.

The fluid-tight enclosure 13 of this invention may be of any convenient shape or construction. FIGS. 2, 3, 4, and 5 show alternate embodiments of the enclosure and the same reference numerals will be used for identical parts in all embodiments and such identically numbered parts are substantially identical in structure, function, and operation. Therefore, to eliminate confusing duplication, these parts, their interrelationship, and their function will be described only in conjunction with a single embodiment, such description applying to all embodiments where these parts appear. The valves, gauge, and bleed tube are not shown in the alternate embodiments for simplicity.

FIG. 2 illustrates an enclosure 13a, in which the bellows 39 extends into the work-receiving area 29′. The work-receiving area 29′ is defined by a hollow cylindrical shell 31′ which is sealed at the bottom by the annular flange 47, the closure plate 33, O-ring 49, and bolts 51. An annular flange 65 extends radially inward from the top of the shell 31′ and the upper end of the generally cylindrical bellows 39 is secured to the inner edge of the flange 65. The bellows 39 extends into the hollow cylindrical shell 31′ and the pressure plate 41 is secured to its lower end. A pressure transmitting fluid 45 fills the enclosure. On the application of external pressure to the pressure plate 41, the bellows 39 expands into the shell 31′ to compress the fluid 45 therein.

FIG. 3 illustrates an enclosure, 13b, wherein the movable member of the pressure transmitting area is a piston instead of a bellows. The structure defining the work-receiving area 29′ is substantially identical to that shown in FIG. 2, including the annular flange 65. A piston 67 is slidably positioned within the shell 31′. Compressible rings 69 such as O-rings form a fluid-tight seal between the piston 67 and the inner surface of the shell 31′. In use, the shell 31′ is filled with the fluid 45 until the piston 67 is in a predetermined position. Upon application of pressure to the upper surface of the piston 67, the piston moves inwardly into the work-receiving area 29' to compress the fluid 45. In this embodiment, the various valves and gauges (FIG. 1) are preferably mounted in the walls of the shell 31'.

Another alternate embodiment, 13c, is shown in FIG. 4. The structure of the work-receiving area 29' of this embodiment is substantially the same as that shown in FIGS. 2 and 3 with the exception that the annular flange 65 is replaced by a disc-shaped cover 70 having a threaded tubular neck 71 extending upwardly through its center portion. A removable bellows unit 73 is provided which consists of a bellows 39 having a pressure plate 41 secured to its upper end and a disc-shaped bottom member 75 secured to its lower end. A threaded tubular neck 77 extends through the center portion of the bottom member 75 and threadedly engages the neck 71 to form a fluid passage 79 between the bellows unit 73 and the work-receiving area 29'. In operation, the work-receiving area 29', the bellows unit 73, and the passage 79 therebetween are filled with the fluid 45. Pressure applied to the pressure plate 41 compresses the fluid in the bellows unit 73 which in turn transmits the pressure through the passage 79 to the fluid in the work-receiving area 29'. This embodiment allows various bellows units to be used interchangeably according to pressure requirements and also for quick replacement of damaged units.

FIG. 5 illustrates still another embodiment of the enclosure, 13d. The structure defining the work-receiving area 29' is substantially identical to that shown in FIG. 4 including the cover 70. In this embodiment a thin flexible box or envelope 81 is used in place of the bellows unit 73 in FIG. 4. The envelope 81 is formed with a threaded neck 77 which threadedly engages the neck 71 to form a fluid-tight passage 79 between the envelope 81 and the work-receiving area 29'. When external pressure is applied to the envelope 81, the walls of the envelope deform inwardly to compress the fluid therein. The fluid pressure is transmitted to the work-receiving area through the passage 79 as in the apparatus of FIG. 4.

The apparatus and methods of this invention are particularly adapted to the transmission of pressure between dissimilar fluids which have significantly differing compressibilities. The most apparent example is between gases and liquids. When high pressure is applied to liquids, significant changes in volume result. Below is a volume expansion and contraction table for water at room temperature:

TABLE 1.—VOLUME-PRESSURE RELATIONSHIP FOR WATER AT ROOM TEMPERATURE

| Pressure (p.s.i.) | Contraction (in. 3/ft. 3) | Percent Contraction |
| --- | --- | --- |
| 10,000 | 57.6 | 3.34 |
| 20,000 | 105.2 | 6.09 |
| 30,000 | 162.8 | 9.42 |
| 40,000 | 210.4 | 12.21 |

If a closed container filled with a specimen and a liquid is subjected to a high external pressure within a pressure vessel, the container will collapse unless some form of pressure transmission and volume compensation is incorporated in the container. The present invention provides for the required volume compensation and pressure transmission and thus allows pressure to be applied to a specimen with a liquid such as water while pumping a more convenient fluid such as a gas.

Particular success has been achieved using the enclosure shown in FIG. 2. The enclosure was filled with water, sealed, and subjected to 10,000 p.s.i. of helium. The unit functioned as desired and no water leakage occurred. The unit was then subjected to 30,000 p.s.i., also using helium. Again the isostatic pressure was transmitted to interior of the enclosure and no leakage or deformation of the enclosure occurred.

This invention allows the conversion of a gas-pressure autoclave to a liquid hydrostatic chamber conveniently and rapidly by merely removing the internal furnace unit and inserting a fluid-tight enclosure according to this invention. This eliminates the necessity of pumping a liquid into the pressure vessel and the extensive clean-up of the vessel required before using the vessel again as a gas-pressure, high-temperature autoclave.

The apparatus of this invention may also be used in environmental testing such as the simulation of ocean depths. When used for this purpose, an instrument package or apparatus to be tested is loaded into the fluid-tight enclosure and the enclosure is filled with salt water. Various electrical leads and connections for monitoring and actuating devices may be installed in the apparatus. The enclosure is then subjected to external pressure which is transmitted to the instruments being tested through the pressure transmitting area of the enclosure. In this manner pressures at various ocean depths may be simulated for prolonged periods of time in a laboratory environment. Pumping non-corrosive elements such as gases or oil in the pressure vessel instead of salt water provides increased service life for pressure vessel assemblies.

The apparatus of this invention may employ any convenient movable member in the pressure transmitting area of the fluid-tight enclosure. The term bellows as used herein means any pleated expansible part made of leather, rubber, metal, or other material which forms a fluid-tight passage. The pleats of the bellows may be either angular or smooth convolutions. The primary requirement is that the material used for the bellows or other movable member be impervious to the pressure transmitting medium(s) at the pressures employed. More than one bellows unit or movable member may be employed where desirable. Partially pleated flexible diaphrams may also be used in place of bellows where low pressures are used.

It is to be understood that the foregoing detailed description is given merely by way of illustration and that many variations and modifications may be made therefrom without departing from the true spirit and scope of the invention, and that all such variations and modifications falling within the true spirit and scope of the invention are intended to be encompassed by the appended claims:

We claim:

1. An isostatic pressure transmitting apparatus, comprising:
   (a) a first fluid-tight enclosure, sealed and filled with a first pressure transmitting fluid, for containing an article to be subjected to isostatic fluid pressure, said first enclosure having at least one movable member defining an outer wall portion, the volume of said first enclosure being variable by pressure upon, and inward movement of, said movable member;
   (b) a second fluid-tight enclosure sealed and containing said sealed first enclosure, said first enclosure being spaced from interior walls of said second enclosure; and
   (c) means for filling and pressurizing said second enclosure with a second pressure transmitting fluid for moving said movable member to compress said first pressure transmitting fluid and thereby subject said article to isostatic pressure.

2. Apparatus according to claim 1 wherein said movable member is a pleated expansible bellows.

3. Apparatus according to claim 2 wherein said bellows is metallic.

4. Apparatus according to claim 1 wherein said first enclosure is substantially cylindrical.

5. Apparatus according to claim 1 wherein said movable member is a diaphragm.

6. Apparatus according to claim 5 wherein said diaphragm is metallic.

7. Apparatus according to claim 1 wherein said movable member is a piston.

8. Apparatus according to claim 1 wherein said movable member is a collapsible envelope.

9. Apparatus according to claim 1 wherein means are provided for maintaining elevated temperatures within said second enclosure.

10. Apparatus according to claim 1 wherein said first pressure transmitting fluid is a liquid.

11. Apparatus according to claim 10 wherein said liquid is water.

12. Apparatus according to claim 10 wherein said liquid is salt water.

13. A method of transmitting isostatic pressure to an article, comprising:
(a) placing said article within a first fluid-tight enclosure having at least one movable member defining an outer wall portion of said first enclosure;
(b) filling said first enclosure with a first pressure transmitting fluid surrounding said article;
(c) sealing said first enclosure;
(d) placing said filled and sealed first enclosure within a second fluid-tight enclosure, said first enclosure being spaced from interior walls of said second enclosure;
(e) sealing said second enclosure; and
(f) filling and pressurizing said second enclosure with a second pressure transmitting fluid, said second pressure transmitting fluid applying isostatic pressure upon said first enclosure and moving said movable member inwardly to compress said first pressure transmitting fluid and thereby apply isostatic pressure to said article without collapsing said first enclosure.

14. The method of claim 1 including the step of prepressurizing said first enclosure until said movable member is in a predetermined position.

15. The method of claim 13 wherein said movable member is a pleated expansible bellows.

16. The method of claim 13 wherein said first pressure transmitting fluid is a liquid.

17. The method of claim 16 wherein said liquid is water.

18. The method of claim 13 wherein said movable member is a piston.

19. The method of claim 16 wherein said second pressure transmitting fluid is an inert gas.

20. The method of claim 19 wherein said inert gas is helium.

21. The method of claim 13 wherein said first pressure transmitting fluid has a compressibility which differs from the compressibility of said second pressure transmitting fluid.

22. The method of claim 21 wherein the compressibility of said first pressure transmitting fluid is substantially greater than the compressibility of said second pressure transmitting fluid.

23. The method of claim 13 wherein said article comprises powdered materials confined in a flexible envelope which is evacuated and fluid-tight sealed and including the step of maintaining a predetermined fluid pressure on said envelope for a period of time to compact said materials into a body of particular shape and density.

24. The method of claim 23 including the step of heating said materials to a bonding temperature.

25. The method of claim 13 wherein said article comprises at least two parts assembled in close proximity and confined in a flexible envelope which is evacuated and fluid-tight sealed to bring mating surfaces of the parts into intimate contact and including the steps of
(a) heating said parts to a bonding temperature, and
(b) mantaining a predetermined fluid pressure on said envelope for a period of time to allow bonding between the parts.

26. The method of claim 13 wherein said article comprises an apparatus to be tested in an isostatic fluid environment.

References Cited
UNITED STATES PATENTS

| | | | |
|---|---|---|---|
| 2,648,125 | 8/1953 | McKenna et al. | 264—111 |
| 3,313,871 | 4/1967 | Vogel et al. | 264—111 |
| 3,427,011 | 2/1969 | Boyer et al. | 263—40 |

ROBERT F. WHITE, Primary Examiner

J. R. HALL, Assistant Examiner

U.S. Cl. X.R.

18—5; 72—60; 264—109

PO-1050
(5/69)

UNITED STATES PATENT OFFICE
CERTIFICATE OF CORRECTION

Patent No. 3,523,148            Dated August 4, 1970

Inventor(s) Charles B. Boyer and Robert M. Conaway

It is certified that error appears in the above-identified patent and that said Letters Patent are hereby corrected as shown below:

Column 4, line 28, after "pressurizing" insert -- fluid --.

Claim 14, line 1, "claim 1" should read -- claim 13 --.

SIGNED AND
SEALED
NOV 3 1970

(SEAL)
Attest:

Edward M. Fletcher, Jr.
Attesting Officer

WILLIAM E. SCHUYLER, JR.
Commissioner of Patents

Dedication

3,523,148.—*Charles B. Boyer* and *Robert M. Conaway*, Columbus, Ohio. ISOSTATIC PRESSURE TRANSMITTING APPARATUS AND METHOD. Patent dated Aug. 4, 1970. Dedication filed Sept. 11, 1975, by the assignee, *The Battelle Development Corporation.*

Hereby dedicates to the People of the United States the entire remaining term of said patent.

[*Official Gazette November 11, 1975.*]